United States Patent
Dai et al.

(10) Patent No.: US 9,081,919 B2
(45) Date of Patent: Jul. 14, 2015

(54) DESIGN-FOR-MANUFACTURING—DESIGN-ENABLED-MANUFACTURING (DFM-DEM) PROACTIVE INTEGRATED MANUFACTURING FLOW

(71) Applicant: GLOBALFOUNDRIES Singapore Pte. Ltd., Singapore (SG)

(72) Inventors: Vito Dai, Santa Clara, CA (US); Beng Lye Oh, Singapore (SG); Chiu Wing Hui, Singapore (SG); Yeow Loye Siew, Singapore (SG)

(73) Assignee: GLOBALFOUNDRIES SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 14/210,418

(22) Filed: Mar. 13, 2014

(65) Prior Publication Data

US 2014/0282288 A1 Sep. 18, 2014

Related U.S. Application Data

(60) Provisional application No. 61/786,538, filed on Mar. 15, 2013.

(51) Int. Cl.
*G06F 17/50* (2006.01)

(52) U.S. Cl.
CPC ........ *G06F 17/5009* (2013.01); *G06F 17/5081* (2013.01); *G06F 2217/12* (2013.01)

(58) Field of Classification Search
CPC .......................... G06F 2217/12; G06F 17/5081
USPC ....................................................... 716/111
See application file for complete search history.

(56) References Cited

U.S. PATENT DOCUMENTS

| | | | |
|---|---|---|---|
| 7,962,867 B2 * | 6/2011 | White et al. | 716/54 |
| 8,056,022 B2 * | 11/2011 | Robles et al. | 716/52 |
| 8,504,959 B2 * | 8/2013 | Torres Robles et al. | 716/112 |
| 8,516,406 B1 * | 8/2013 | Lai et al. | 716/54 |
| 8,543,965 B1 * | 9/2013 | Lai et al. | 716/136 |
| 8,615,724 B2 * | 12/2013 | Durkan | 716/56 |
| 8,707,221 B2 * | 4/2014 | Durkan | 716/52 |
| 8,799,830 B2 * | 8/2014 | Robles | 716/51 |
| 2005/0251771 A1 * | 11/2005 | Robles | 716/5 |
| 2006/0150129 A1 * | 7/2006 | Chiu et al. | 716/4 |
| 2006/0242618 A1 * | 10/2006 | Wang et al. | 716/19 |
| 2007/0198958 A1 * | 8/2007 | Tang et al. | 716/4 |
| 2007/0240085 A1 * | 10/2007 | Bickford et al. | 716/4 |
| 2007/0240090 A1 * | 10/2007 | Bickford et al. | 716/12 |
| 2007/0266346 A1 * | 11/2007 | Wu | 716/2 |
| 2008/0046846 A1 * | 2/2008 | Chew et al. | 716/2 |
| 2008/0134106 A1 * | 6/2008 | Riviere-Cazaux | 716/2 |
| 2008/0209365 A1 * | 8/2008 | Riviere-Cazaux | 716/4 |
| 2009/0119542 A1 * | 5/2009 | Nagashima et al. | 714/33 |
| 2009/0144692 A1 * | 6/2009 | Cain et al. | 716/19 |
| 2009/0235209 A1 * | 9/2009 | Sawicki et al. | 716/1 |

(Continued)

*Primary Examiner* — Stacy Whitmore

(74) *Attorney, Agent, or Firm* — Horizon IP Pte. Ltd.

(57) ABSTRACT

System and methods for design-for-manufacturing and design-enabled-manufacturing (DFM-DEM) proactive integrated manufacturing flow are presented. A method includes receiving design data related to layout of an integrated circuit (IC); extracting information from the design data; and performing analysis on the extracted information. The method also enables DFM-DEM aware manufacturing applications using information stored in a knowledge database. The method further updates the knowledge database with new information learned from at least the extracted information and the analysis.

21 Claims, 4 Drawing Sheets

(56) References Cited

U.S. PATENT DOCUMENTS

| | | | |
|---|---|---|---|
| 2009/0288047 A1* | 11/2009 | Tang et al. ........................ 716/4 |
| 2009/0307649 A1* | 12/2009 | Pramanik et al. ............... 716/19 |
| 2010/0185994 A1* | 7/2010 | Pikus et al. ...................... 716/5 |
| 2011/0016444 A1* | 1/2011 | Paris et al. .................... 716/111 |
| 2011/0061030 A1* | 3/2011 | Mansfield et al. .............. 716/50 |
| 2012/0011480 A1* | 1/2012 | Srinivasan .................... 716/103 |
| 2012/0042290 A1* | 2/2012 | Berkens et al. ................. 716/55 |
| 2012/0180007 A1* | 7/2012 | Ueda ............................... 716/55 |
| 2013/0174110 A1* | 7/2013 | Durkan ......................... 716/112 |
| 2013/0174111 A1* | 7/2013 | Durkan ......................... 716/112 |
| 2013/0263074 A1* | 10/2013 | Ferguson ..................... 716/112 |
| 2014/0033159 A1* | 1/2014 | Hui et al. ...................... 716/132 |
| 2014/0040850 A1* | 2/2014 | Sawicki et al. ............... 716/132 |
| 2014/0059511 A1* | 2/2014 | Benware et al. .............. 716/136 |
| 2014/0189613 A1* | 7/2014 | Tomblin et al. ................. 716/52 |

* cited by examiner

DESIGN-FOR-MANUFACTURING—DESIGN-ENABLED-MANUFACTURING (DFM-DEM) PROACTIVE INTEGRATED MANUFACTURING FLOW

CROSS-REFERENCE TO RELATED APPLICATION

This application claims the priority benefit of U.S. Provisional Application Ser. No. 61/786,538, filed on Mar. 15, 2013, which is herein incorporated by reference in its entirety.

BACKGROUND

Chip manufacturers often spend huge amounts of time and effort in the area of Design-For-Manufacturability (DFM) where specific rules are defined to help guide designers, or process-related sensitivity information is captured in an abstract or model format and provided to designers for manufacturability simulations. This allows actions to be taken in design change before tape out to improve manufacturability. However, the reality is that in advanced designs it may not be possible to comply with all the foundry-specified DFM rules. Many are not feasible based on timing, area and/or power requirements, or due to specific design techniques needed. Besides, there could exist specific design features that are sensitive to the process variation but are of black-box to the foundry.

There is, therefore, a need for a solution to fill the gaps between the design and manufacturing domains to ensure good process and product yield.

SUMMARY

Embodiments generally relate to a DFM-DEM proactive integrated manufacturing flow. In one embodiment, a method is disclosed. The method includes receiving design data related to layout of an integrated circuit (IC); extracting information from the design data; and performing analysis on the extracted information. The method also enables DFM-DEM aware manufacturing applications using information stored in a knowledge database. The method further updates the knowledge database with new information learned from at least the extracted information and the analysis.

In another embodiment, a system is disclosed. The system includes a processing unit and a memory. The memory includes a program module configured to receive design data related to layout of an integrated circuit (IC), extract information from the design data and perform analysis on the extracted information. The program module is also configured to enable design-for-manufacturing and design-enabled-manufacturing (DFM-DEM) aware manufacturing applications using information stored in a knowledge database, and update the knowledge database with new information learned from at least the extracted information and the analysis.

These and other advantages and features of the embodiments herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of various embodiments. In the following description, various embodiments of the present disclosure are described with reference to the following.

DETAILED DESCRIPTION

Figure 1:
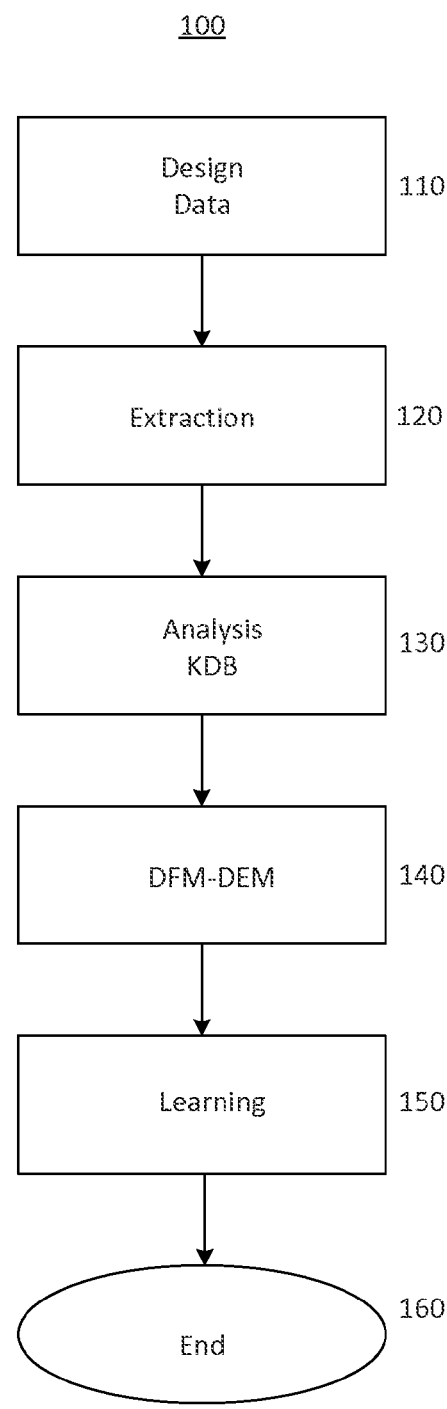
FIG. 1 shows a process of a DFM-DEM proactive integrated manufacturing flow.

DFM and DEM are two complementary sets of methodology, which mirror one another by tightly coupling flows in the design space with process sensitivity and yield data in the manufacturing space. DFM provides process awareness into the design cycle through accurately calibrated models and novel verification flows (DFM sign-off). In DFM, information related to design is used for pattern matching to determine weak points so as to improve design layout and/or OPC retargeting on the reticles. Design-Enabled-Manufacturing (DEM) enables design-aware manufacturing, manufacturing/design co-optimization, using automated physical design analysis and characterization which in turn drive process optimization that is fine-tuned to specific customer product designs. In DEM, information related to processes is utilized.

A primary concept behind the DFM-DEM proactive integrated manufacturing flow of the present disclosure is about profiling design layouts for features that require close monitoring or process optimization. It allows a foundry to identify manufacturing marginal structures and sensitive area to help set up inline monitoring and control to address those weak points in an earlier point in time, prior to the silicon process. A DFM-DEM knowledge database is implemented to be closely coupled to the design layout with yield detractor data. The DFM-DEM knowledge database supports search capability and allows identification of unique characteristics of various designs. The proposed scheme can be deployed in advance of manufacturing to aid better understanding of the impact of specific design features.

The DFM-DEM proactive integrated manufacturing flow in accordance with the present disclosure complies with DFM simulations and layout profiling of the design layouts. The proposed scheme extracts design attributes and features of interest. It also analyzes, classifies and/or compares the extracted information with data tracked in the DFM-DEM knowledge database. It further utilizes and correlates the information with existing silicon data and the DFM-DEM knowledge database to enable DFM-DEM aware manufacturing applications including, but not limited to, the following: process prediction, process recipe optimization, process control, monitoring, in-line scan, scan diagnostic data analysis, metrology, failure analysis, design-technology co-optimization and DFM deck optimization. The DFM-DEM knowledge database accumulates the learning therein, and is thus a self-learning knowledge database.

The DFM-DEM knowledge database in accordance with the present disclosure is key to the DFM-DEM proactive integrated manufacturing flow described herein. It stores information related to process sensitivity (e.g., process window including process parameters and process critical dimensions), design information including type of hotspots (e.g., material necking/pinching, material bridging, high topography height, low topography height) and width, location of pattern in mask, pattern type or identification, and mask simulation information. Mask simulation information may include, for example, simulated topography height, copper height and location, dielectric height and location, simulated contour of patterns and associated locations, simulated critical dimensions (CD) of width and space of the patterns, simulated Critical Area Analysis (CAA) score, simulated Manufacturing Analysis and Scoring (MAS) score. Once metrology is completed, the DFM-DEM knowledge database may further store the actual heights (e.g., silicon topography height, copper height, and dielectric height), the actual scanning electron microscope (SEM) silicon image clips of the patterns, and the actual CD of width and space of the patterns.

The DFM-DEM knowledge database stores the MAS score of each recommended rule and its yield impact in the design. More specifically, there are several categories of the recommended rule in MAS as follows: yield redundancy (e.g., redundant contacts and redundant vias), yield marginality (e.g., via enclosure), yield variability (e.g., diffusion space to inner vertex of poly, and poly space to inner vertex of diffusion), and yield critical area (e.g., the minimum metal area, contact area, etc.).

Additionally, the DFM-DEM knowledge database stores pattern matching results and layout profiled results. The pattern matching results may include, for example, marginal or critical patterns which are detected (matched) from each design. Each pattern has an associated pattern identification (ID). The layout profiled results may include, for example, design feature of manufacturing interest, e.g., single isolated via with minimum enclosure. There are more than ten features that may be profiled and thus the above list of results is only an example and may be longer.

Therefore, the DFM-DEM proactive integrated manufacturing flow in accordance with the present disclosure provides a number of benefits including, but not limited to, key technical values, accumulation of yield learning, accelerated yield ramp, ability to articulate design-technology co-optimization, and accurate DFM models.

FIG. 1 shows a process 100 of a DFM-DEM proactive integrated manufacturing flow in accordance with the present disclosure. At 110, design data, such as data related to layout of integrated circuits (IC), is received. At 120, information, such as design attributes and features of interest, is extracted from the received design data to profile the design data. In some embodiments, the extraction may be based on one or more of the following factors: features profiling (e.g., layout profiling), pattern matching (e.g., search and matching), simulations, lithography simulation, chemical-mechanical polishing (CMP) simulation, CAA simulation and MAS simulation. In some embodiments, process 100 may generate a report on one or more results from the extraction. At 130, analysis of the extraction result is performed, for example, to match information in the report to information stored in the DFM-DEM knowledge database (KDB).

At 140, information stored in the DFM-DEM knowledge database is used to enable DFM-DEM aware manufacturing applications. In some embodiments, process 100 may correlate information stored in the DFM-DEM knowledge database with existing silicon data. Examples of DFM-DEM aware manufacturing applications may include, but not limited to, process prediction, process recipe optimization, process control, monitoring, inline scan, scan diagnostic data analysis, metrology, failure analysis, design-technology co-optimization and DFM deck optimization. Process prediction may include, for example, establishing patterns of previous products process result, utilizing results of the establishing for fuzzy pattern matching with one or more new products, classifying the one or more new products with one or more matched results, performing layout profiling, and utilizing information previously stored in the knowledge database for process prediction and control.

With respect to design-technology co-optimization, a user may drive optimization (modification) to either or both design and technology. For example, the user may desire to change the retarget or optical proximity correction (OPC) recipe to fix a simulated bridging issue. As another example, the user may drive the designer to increase the spacing. Alternatively, both OPC recipe change and design change may be required. With respect to DFM deck optimization, if new problematic patterns from the silicon are discovered, such new patterns may be added into the pattern library in the DFM deck. The objective here is to maintain a silicon-accurate DFM deck.

At 150, the DFM-DEM knowledge database is updated with new information learned from at least the extracted information and the analysis. For example, new information from above-described operations is stored in the DFM-DEM knowledge database. As the DFM-DEM knowledge database continues to accumulate new information it is deemed as a self-learning knowledge database. The new information may include, for example, one or more new pattern issues, one or more new masks, or a combination thereof. Although FIG. 1 shows that process 100 ends at 160, in various embodiments, process 100 is a repetitious process in that it repeats itself (i.e., starts from 110 after 150).

Figure 2:
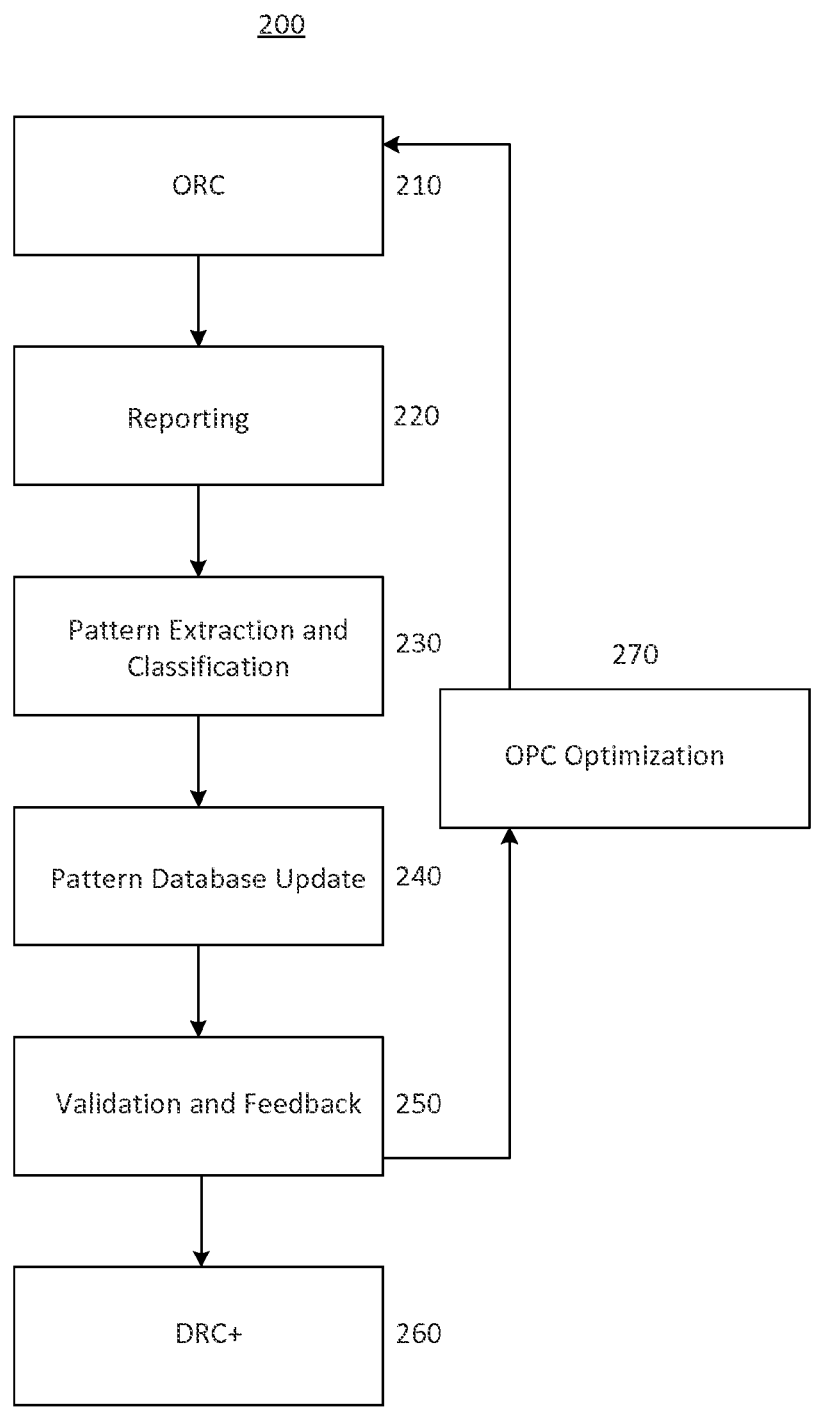
FIG. 2 shows a process of process recipe optimization.

FIG. 2 shows a process 200 of process recipe optimization in accordance with the present disclosure. At 210, optical rule checking (ORC) simulation is performed to detect hotspots. At 220, a report on the ORC simulation result is generated. The report may be, for example, an XML report. At 230, one or more layout patterns are extracted and classified. At 240, the DFM-DEM knowledge database is updated with the pattern results of the extraction and classification of the one or more layout patterns. At 250, hotspots are validated and feedback is provided to OPC team for recipe optimization. Upon validation, process 200 proceeds to 260 and 270. At 260, validated critical patterns are added into the design rule checking plus (DRC+) process described below. At 270, the OPC team makes use of the validated critical pattern results to optimize the OPC recipe, including but not limited to OPC retargeting and OPC biasing.

In some embodiments, ORC simulation may be performed after OPC and contour simulation of the layout shapes. It checks for attributes such as minimum critical dimension (min-CD) for the width and spacing of the contour edge across the process window. For example, if the min-CD of a metal width is too small, it may be an "open", "pinching" or "necking" hotspot. If the min-CD of a line spacing is too small, it may be a "short" or "bridging" hotspot.

Figure 3:
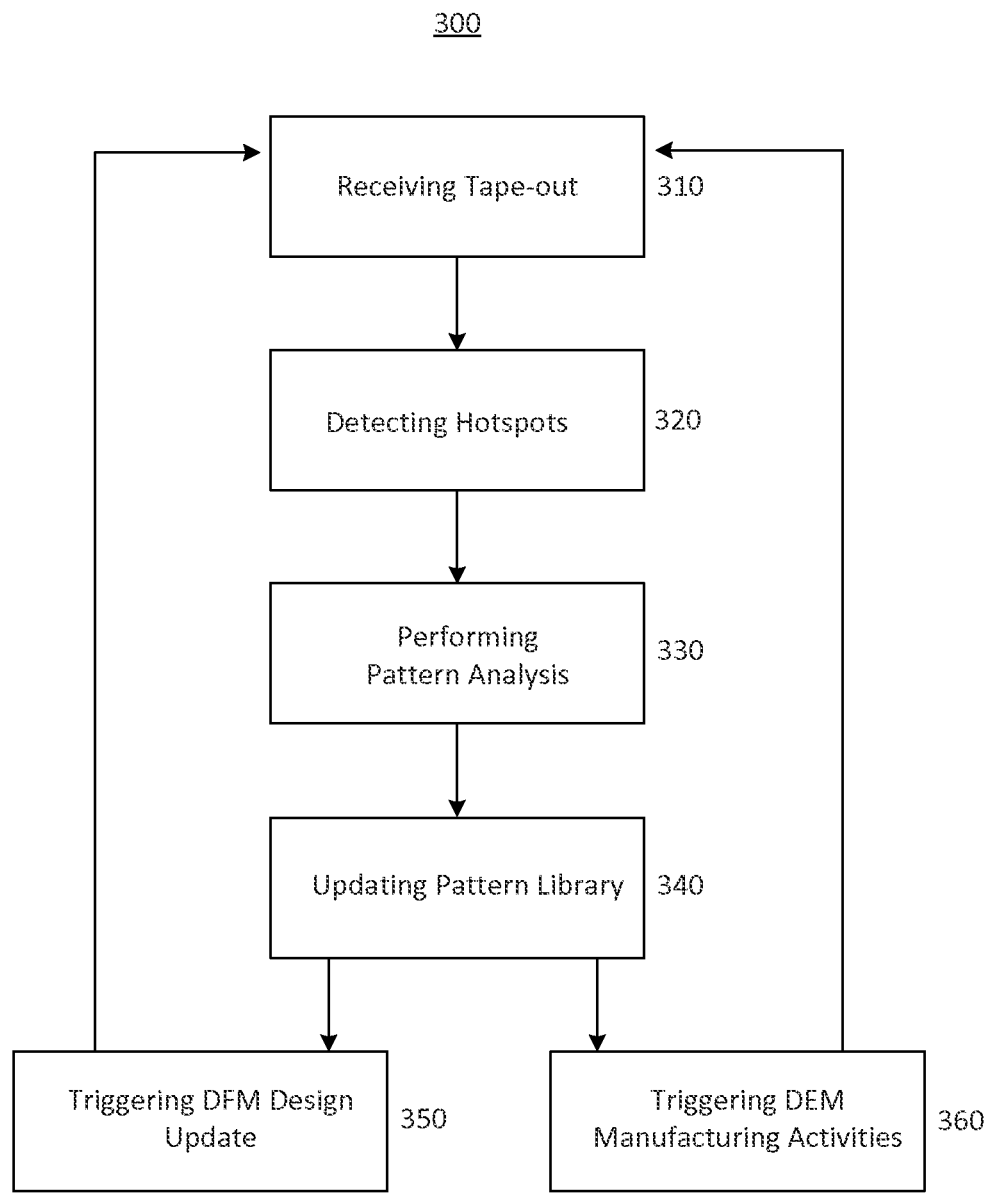
FIG. 3 shows a process of design rule checking plus.

FIG. 3 shows a process 300 of design rule checking plus (DRC+) in accordance with the present disclosure. Design rule checking (DRC) is the area of electronic design automation that determines whether the physical layout of a particular chip layout satisfies a series of topology parameters called design rules. DRC+ deck, as referred herein, is a deck based on two-dimensional shapes pattern matching. It includes a pattern library developed from the pattern database and will drive pattern-matching tools to analyze the design layout and intelligently detect if any shape patterns in the layout match those in the pattern library. The deck will then report what patterns are detected as well as the location of the detected patterns.

At 310, tape-out of a semiconductor chip design is received. At 320, data preparation and lithography verification and simulation are performed to detect one or more hotspots. Lithography simulation, or better known as OPC verification, may capture lithography hotspots which sometimes may number in the thousands depending on the design. At 330, pattern analysis is performed by utilizing pattern database, which is a feature of the DFM-DEM knowledge database, to classify at least one of the one or more hotspots. At 340, a pattern library associated with the pattern database is updated. In some embodiments, in classifying at least one of the one or more hotspots, process 300 may classify each of the at least one of the one or more hotspots as a known critical pattern, a known non-critical pattern, an unknown critical pattern, or an unknown non-critical pattern. The pattern database may treat all hotspots as patterns and report known and unknown critical and non-critical patterns. Unknown critical patterns may be added to the pattern library and as such, less unknown critical patterns may exist as more designs passed through this flow. In some embodiments, in updating the pattern library, process 300 may add the unknown critical patterns to the pattern library.

At 350, process 300 may trigger DFM design kits update to drive design change. The DFM design kits may include but not limited to DRC+, MAS, CAA, layout profiling and CMP simulation tools. The DFM design kits update will be in accordance to the DFM-DEM knowledge database based at least in part on the classified at least one of the one or more hotspots, such as unknown critical patterns, or flag the classified hotspot(s) in design phase. Correction or optimization in design stage is enabled. Thus, the future chip design may utilize the updated DFM design kits to detect and fix the critical patterns in the design phase. And so new semiconductor chip design received at 310 may have the critical patterns minimized or eliminated prior to the tape-out. That is, taking the DFM path to the design space, an example may include but not limited to unknown critical patterns may trigger an update in DRC+ deck to capture and update these unknown critical patterns to match during the DRC+ execution. In some embodiments, the DRC+ deck may contain only the most critical patterns to match, e.g., 200 or more out of 500,000 or more. Advantageously, a user of the updated deck would have this previously unknown pattern flagged and may have it corrected during the design change stage. If the user fixed as many matched critical patterns in the updated design and tape-out, the pattern database pattern analysis may capture less known critical patterns.

At 360, process 300 may trigger DEM manufacturing activities such as in-line monitoring, or process change by the classified hotspot(s), or validating the classified hotspot(s) through manufacturing. The manufacturing validated result may be fed back to lithography and pattern recognition process or DFM flow. Lithography simulation recipe may be updated accordingly or the DFM-DEM knowledge database may be updated to include the validated result for further use. That is, taking the DEM path to the process space, known and unknown critical patterns may trigger to capture the layout clips for fab to analyze and make necessary inline monitoring or process changes. The fab may validate the unknown critical patterns and feedback valid critical patterns to ORC and DFM team. The ORC team may need to update lithography simulation recipe and DFM team to include these critical patterns as fab identified critical patterns to match. This feed forward to the user and feed backward to the fab processes may continue and help to achieve the process awareness and manufacturing/design co-optimization goals.

Figure 4:
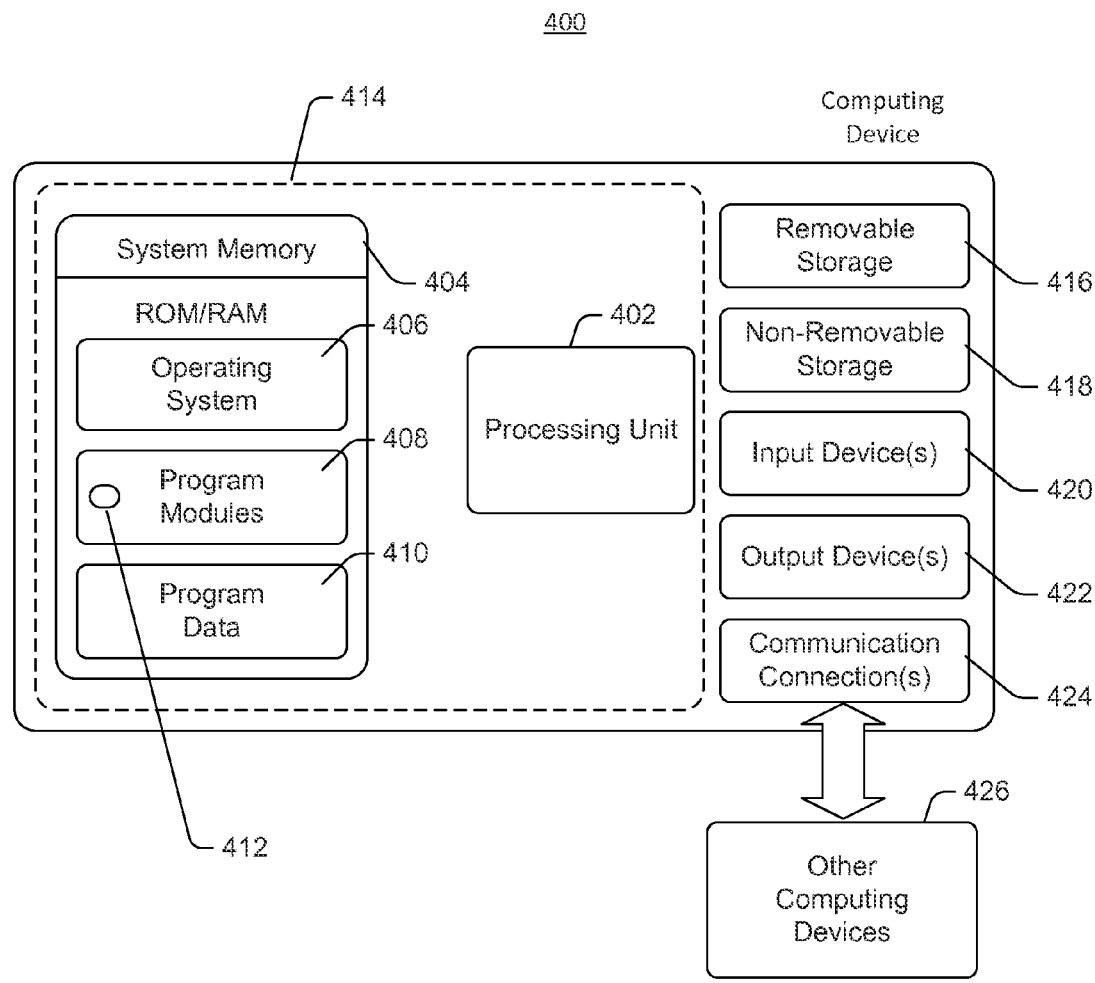
FIG. 4 shows an example computing device that implements DFM-DEM proactive integrated manufacturing flow.

FIG. 4 shows an example computing device 400 that implements DFM-DEM proactive integrated manufacturing flow in accordance with an embodiment of the present disclosure. However, it will be readily appreciated that the techniques disclosed herein may be implemented in other computing devices, systems, and environments. The computing device 400 shown in FIG. 4 is only one example of a computing device and is not intended to suggest any limitation as to the scope of use or functionality of the computer and network architectures.

In at least one configuration, computing device 400 typically includes at least one processing unit 402 and system memory 404. Depending on the exact configuration and type of computing device, system memory 404 may be volatile (such as RAM), non-volatile (such as ROM, flash memory, etc.) or some combination thereof. System memory 404 may include an operating system 406, one or more program modules 408, and may include program data 410. The computing device 400 is of a very basic configuration demarcated by a dashed line 414. Again, a terminal may have fewer components but may interact with a computing device that may have such a basic configuration.

In one embodiment, the program module 408 includes a DFM-DEM proactive integrated manufacturing flow module 412. The DFM-DEM proactive integrated manufacturing flow module 412 is configured to carry out one or more functionalities and processes as described above with reference to FIGS. 1-3 and any variations thereof. For example, when the DFM-DEM proactive integrated manufacturing flow module 412 is properly configured, the computing device 400 may carry out the operations of processes 100, 200 and 300 of FIGS. 1, 2 and 3, respectively, and any variations thereof.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by removable storage 416 and non-removable storage 418. Computer storage media may include volatile and nonvolatile, removable and non-removable media implemented in any method or technology for storage of information, such as computer readable instructions, data structures, program modules, or other data. System memory 404, removable storage 416 and non-removable storage 418 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of the computing device 400. Computing device 400 may also have input device(s) 420 such as keyboard, mouse, pen, voice input device, touch input device, etc. Output device(s) 422 such as a display, speakers, printer, etc. may also be included. System memory 404, removable storage 416, non-removable storage 418, or a combination thereof may be utilized to store the DFM-DEM knowledge database as described above. Alternatively, the DFM-DEM knowledge database may be stored in a storage device external to computing device 400.

Computing device 400 may also contain communication connections 424 that allow the device to communicate with other computing devices 426, such as over a network. These networks may include wired networks as well as wireless networks. Communication connections 424 are some examples of communication media. Communication media may typically be embodied by computer readable instructions, data structures, program modules, etc.

It is appreciated that the illustrated computing device 400 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, and/or the like.

The inventive concept of the present disclosure may be embodied in other specific forms without departing from the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

What is claimed is:

1. A method comprising:
   using a computer for
      receiving design data related to layout of an integrated circuit (IC);
      extracting information from the design data;
      performing analysis on the extracted information;
      enabling design-for-manufacturing (DFM) and design-enabled-manufacturing (DEM) aware manufacturing (collectively DFM-DEM) applications using information stored in a knowledge database, wherein the knowledge database stores information related to DFM and DEM for facilitating DFM-DEM aware manufacturing; and
      updating the knowledge database with new information learned from at least the extracted information and the analysis.

2. The method of claim 1, wherein the extracted information include design attributes and features of interest.

3. The method of claim 1, wherein the extracting information comprises extracting the information based on features profiling, pattern matching, simulations, lithography simulation, chemical-mechanical polishing (CMP) simulation, Critical Area Analysis (CAA) simulation, Manufacturing Analysis and Scoring (MAS) simulation, or any combination thereof.

4. The method of claim 1, wherein the DEM aware manufacturing applications comprise process prediction, process recipe optimization, process control, monitoring, inline scan, scan diagnostic data analysis, metrology, failure analysis, design-technology co-optimization and DFM deck optimization.

5. The method of claim 4, wherein process prediction comprises:
   establishing patterns of previous products process result;
   utilizing results of the establishing for fuzzy pattern matching with one or more new products;
   classifying the one or more new products with one or more matched results;
   performing layout profiling; and
   utilizing information previously stored in the knowledge database for process prediction and control.

6. The method of claim 4, wherein process recipe optimization comprises:
   performing optical rule checking (ORC) simulation to detect hotspots;
   generating a report on a result of the ORC simulation;
   extracting and classifying one or more layout patterns;
   updating a pattern database with results of the extracting and classifying; and
   validating the hotspots and providing a feedback.

7. The method of claim 6, further comprising:
   updating the knowledge database with the report on the result of the ORC simulation and the results of the extracting and classifying.

8. The method of claim 1, wherein the new information comprises one or more new pattern issues, one or more new masks, or a combination thereof.

9. The method of claim 1, wherein the knowledge database stores information related to process sensitivity, design information including type of hotspots and width, location of pattern in mask, pattern type or identification, and mask simulation information.

10. The method of claim 9, wherein the mask simulation information comprises simulated topography height, copper height and location, dielectric height and location, simulated contour of patterns and associated locations, simulated critical dimensions (CD) of width and space of the patterns, CAA score, simulated MAS score or a combination thereof.

11. The method of claim 9, wherein the knowledge database further stores information comprising actual height of silicon topography, actual height of copper, actual height of dielectric, actual scanning electron microscope (SEM) silicon image clips of patterns, and actual CD of width and space of the patterns.

12. The method of claim 9, wherein the knowledge database further stores information comprising one or more recommended rules and associated yield impact in design, wherein the one or more recommended rules are of categories including yield redundancy, yield marginality, yield variability, and yield critical area.

13. The method of claim 9, wherein the knowledge database further stores information comprising pattern matching results and layout profiled results, wherein the pattern matching results comprise marginal or critical patterns which are detected from each design, and wherein the layout profiled results comprise one or more design feature of manufacturing interest.

14. The method of claim 1, further comprising:
   generating a report on one or more results from the extracting.

15. The method of claim 14, wherein the performing analysis on the extracted information comprises matching information in the report to information stored in the knowledge database.

16. The method of claim 1, further comprising:
   correlating information stored in the knowledge database with existing silicon data.

17. The method of claim 1, further comprising:
   receiving tape-out of a semiconductor chip design;
   performing data preparation and lithography verification and simulation to detect one or more hotspots;
   performing pattern analysis by utilizing pattern database, which is a feature of the knowledge database, to classify at least one of the one or more hotspots; and
   updating a pattern library associated with the pattern database.

18. The method of claim 17, further comprising:
   classifying each of the at least one of the one or more hotspots as a known critical pattern, a known non-critical pattern, an unknown critical pattern, or an unknown non-critical pattern; and
   adding the unknown critical patterns to the pattern library.

19. The method of claim 17, further comprising:
triggering DFM design kits update in the knowledge database based at least in part on the classified at least one of the one or more hotspots.

20. The method of claim 17, further comprising:
triggering DEM manufacturing activities comprising in-line monitoring, process change by the classified at least one of the one or more hotspots, validating the classified at least one of the one or more hotspots through manufacturing, or a combination thereof.

21. A system comprising:
a processing unit; and
a memory, wherein the memory comprises a program module configured to
   receive design data related to layout of an integrated circuit (IC),
   extract information from the design data,
   perform analysis on the extracted information,
   enable design-for-manufacturing (DFM) and design-enabled-manufacturing (DEM) aware manufacturing (collectively DFM-DEM) applications using information stored in a knowledge database, and
update the knowledge database with new information learned from at least the extracted information and the analysis.

* * * * *